(12) United States Patent
Toth

(10) Patent No.: US 9,690,052 B2
(45) Date of Patent: Jun. 27, 2017

(54) COMPOSITE CONNECTION SYSTEM

(71) Applicant: John R. Toth, Clermont, FL (US)

(72) Inventor: John R. Toth, Clermont, FL (US)

(73) Assignee: DEEPLINC, INC., Clermont, FL (US)

( * ) Notice: Subject to any disclaimer, the term of this patent is extended or adjusted under 35 U.S.C. 154(b) by 46 days.

(21) Appl. No.: 13/834,944

(22) Filed: Mar. 15, 2013

(65) Prior Publication Data

US 2014/0270645 A1   Sep. 18, 2014

(51) Int. Cl.
*G02B 6/38*    (2006.01)
*H01R 13/523*  (2006.01)
*H02G 15/14*   (2006.01)

(52) U.S. Cl.
CPC ......... *G02B 6/3816* (2013.01); *G02B 6/3849* (2013.01); *H01R 13/523* (2013.01); *H02G 15/14* (2013.01)

(58) Field of Classification Search
CPC .. G02B 6/3816; G02B 6/3849; H01R 13/523; H02G 15/14
USPC .................................................. 385/53–87
See application file for complete search history.

(56) References Cited

U.S. PATENT DOCUMENTS

| | | | |
|---|---|---|---|
| 5,199,893 A | 4/1993 | Fussell | |
| 5,838,857 A * | 11/1998 | Niekrasz | H01R 13/523 385/56 |
| 6,152,608 A | 11/2000 | Ghara | |
| 7,275,949 B1 | 10/2007 | Speaker | |
| 7,409,127 B1 * | 8/2008 | Hurley et al. | 385/101 |
| 7,618,198 B2 * | 11/2009 | Baxter | G02B 6/3816 385/53 |
| 7,942,588 B2 * | 5/2011 | Durand et al. | 385/77 |
| 8,226,303 B2 * | 7/2012 | Toth | 385/70 |
| 8,267,707 B2 | 9/2012 | Rogers | |
| 8,376,765 B2 * | 2/2013 | Chaize | 439/201 |
| 8,734,026 B2 * | 5/2014 | Nagengast et al. | 385/77 |
| 9,256,032 B2 * | 2/2016 | Toth | G02B 6/3816 |
| 2002/0102066 A1 * | 8/2002 | Nishita | 385/75 |
| 2005/0136722 A1 | 6/2005 | Cairns | |
| 2006/0263011 A1 * | 11/2006 | Chen et al. | 385/75 |
| 2011/0129187 A1 * | 6/2011 | Toth | 385/70 |
| 2013/0094810 A1 * | 4/2013 | Toth | 385/70 |

OTHER PUBLICATIONS

International Search Report and Written Opinion in Corresponding PCT Application No. PCT/US14/28352; Sung Gon Kim.
European Patent Office, Supplementary European Search Report dated Jul. 5, 2016.

* cited by examiner

*Primary Examiner* — Daniel Petkovsek
(74) *Attorney, Agent, or Firm* — Greenberg Traurig, LLP

(57) ABSTRACT

A connector mating system that can enable the coupling and decoupling of electrical or optical communications channels, while in a deep, sub-oceanic, sea-floor environments, during which time the contacting interfaces of the said channels remain fully protected from the destructive effects of the said environment. The system features a Wet-Mate Connector (WMC) that provides a means for electrical, optical and hybrid inter-connection within an extremely hostile environments.

49 Claims, 12 Drawing Sheets

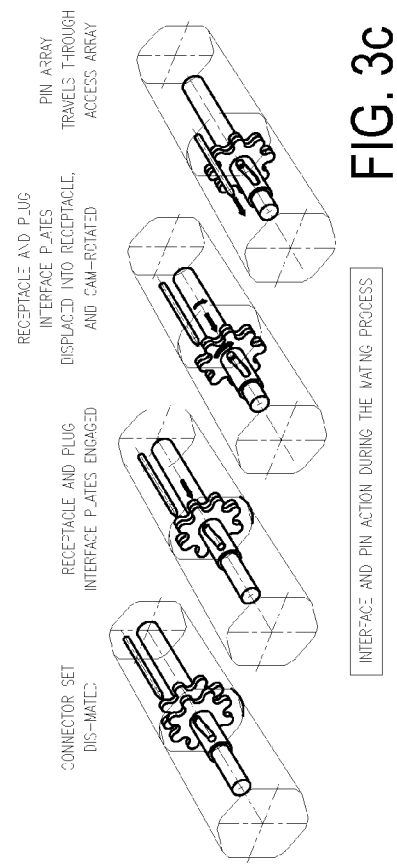
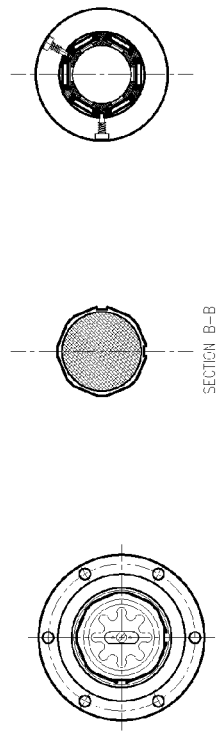
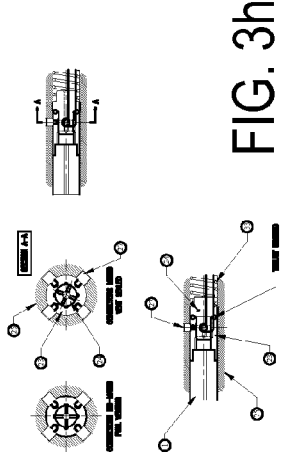

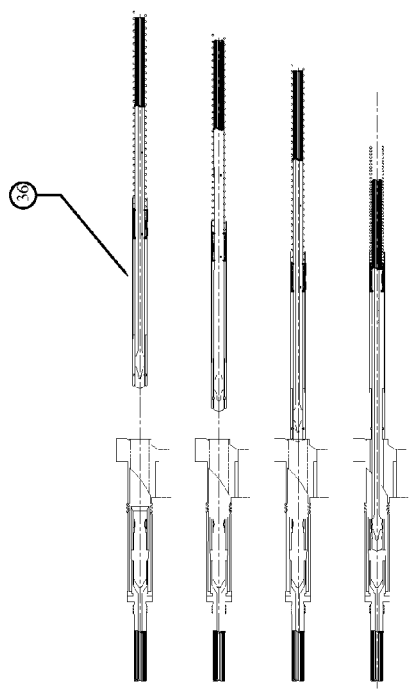
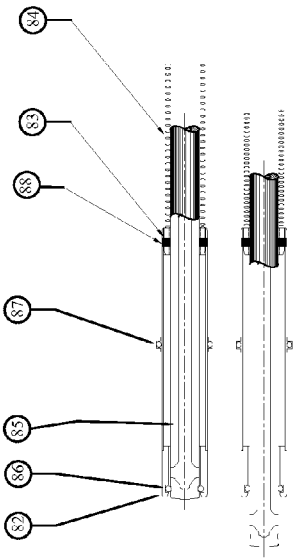
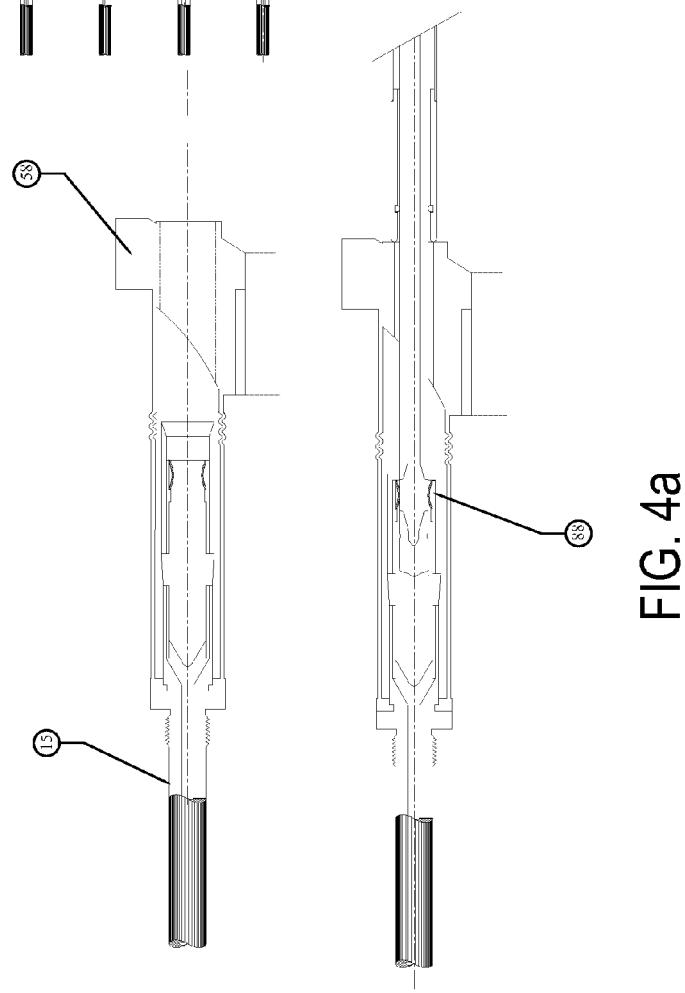
FIG. 4b
FIG. 4c
FIG. 4a

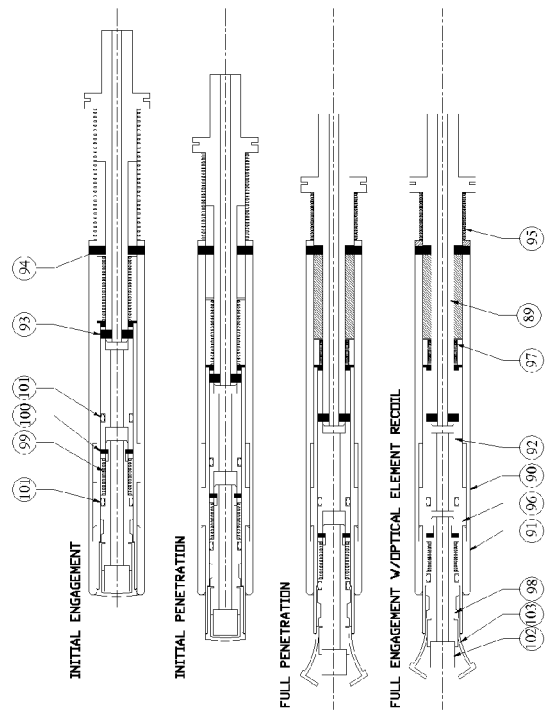
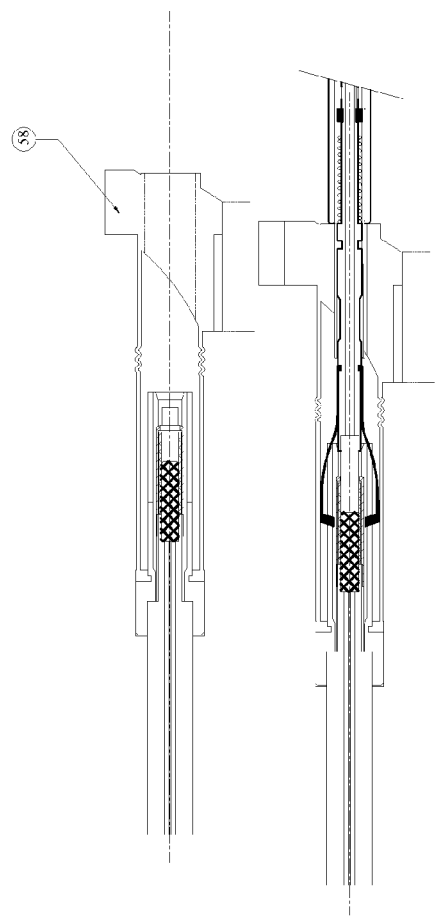

PLUG/RECEPTACLE
ENGAGEMENT SEQUENCE

COMPOSITE CONNECTION SYSTEM

This application includes material which is subject to copyright protection. The copyright owner has no objection to the facsimile reproduction by anyone of the patent disclosure, as it appears in the Patent and Trademark office files or records, but otherwise reserves all copyright rights whatsoever.

FIELD OF THE INVENTION

The present invention relates to systems and methods for electrical or optical connectors, and more specifically, to electrical or optical connectors for connections in deep oceanic environments.

SUMMARY OF THE INVENTION

A connector contact mating mechanism that can enable the coupling and decoupling of electrical power and/or optical and electrical communications channels, while immersed in or surrounded by a contaminating environment, during which time the contacting interfaces of the power or signal channels remain fully protected from the destructive effects of the said environment. This disclosure describes a connector design which is equipped with a dedicated, self-contained mechanical engagement chamber, which forms a clean environment between the surrounding environment and the optical and electrical signal or power contact barriers. This novel design allows engagement of optical contacts, and electrical conductive interfaces in an environment that is an order of magnitude cleaner than conventional harsh environment interconnecting devices. This interconnect concept is intended for sub-oceanic cable communication or power network system applications either as a wet-mateable electrical and/or optical cable-end to cable-end interconnection means, or as a bulkhead-to-flying-lead ROV enabled wet-mateable connection.

BACKGROUND OF THE INVENTION

Driven by cost factors, as well as the need to overcome the hazards and complexities associated with joining and switching of multi-circuit cables in deep oceanic environments, the industry was first introduced to W et-Mateable Connectors (W M C) in the early 1960's. The earliest systems enabled the mating of electrical contacts, in an undersea environment through the use of electrical contacts protected by a dense grease medium, which was then expelled during the process of connection. This wet-connection capability made possible more complex system architectures, but was limited by the inability to disconnect or to reconnect such circuits in under-water conditions. By the 1970's the next phase of under-sea connector development brought to market, commercially viable and fully wet-mateable electrical connection mechanisms. These connectors offered the operator the ability to repeatedly plug and unplug electrical connections, in deeply submerged conditions, either by the manual manipulations of divers, or with the aid of (later developed) submersible, Remote Operated Vehicles (ROVs), linked by control cables to a surface maintenance vessel. This technological advancement provided significantly enhanced system flexibility and made possible the development of large-scale, localized under-sea networks which had not previous been possible. In the 1980's wet-mate connector technology was extended to single-channel-fiber-optic, and hybrid (electric-optic) applications. Then later, in the 1990's, multi-channel electric and "Joined Chamber" multi-channel fiber-optic and hybrid (electric-optic) connectors were introduced. Within several years, this technology became commercially viable, to where multi-channel electric, optic and electric-optic hybrid WMC configurations were marketed by several suppliers. The multi-channel WMC technology developed in the late 1980's and into the 1990's has remained unchanged in commercial WMC products being marketed to the present day.

Shortcomings of the Current State of the Art

A general practice which made possible the development of deep sea connector mechanisms in an environment characterized by pressures of many thousands of pounds per square inch was a method of filling all internal cavities of these connectors with a suitable oil, and then providing, within the circumferential or radial walls of the connector, a bellows or diaphragm membrane, or redundant series of bellows or diaphragm membranes, as an environmental interface, so as to maintain an equal, constant, uniform, and self-regulating pressure, both internal and external to the connector mechanisms. Current W M C art is based on containment of this oil volume within each connector half, and development of a novel unique axial interface end-seal that enables the sealed mechanical joining of an individual plug and receptacle connector half, and the respective contained oil chambers into a single contiguous unit, with a single contiguous oil chamber, while being immersed in the high pressure and contaminated environment. Where the joined oil chambers that serve as the mechanical interface between the connector halves, also share the optic and/or electric contact arrays, and concurrently serve as the contact engagement chamber. And where, within the single contiguous oil volume, or a series of oil volumes limited to one connector half, the electrical and/or optical contacts are joined as part of the mechanical engagement process, such that:

1. "Joined Chamber" connectors have isolated fluid volumes in each connector half, which become a single, contiguous oil volume when the connector halves engage.
2. The single "joined chamber" concurrently serves as the mechanical engagement chamber, and as the contact engagement chamber.
3. Single chamber connector designs may have exposed electrical plug pin(s) on one connector half that engage an isolated receptacle contact, with dielectric fluid volume, or series of dielectric fluid volumes on the opposing connector half.

In each case, the oil volume serves as the primary mechanical interface volume, and also establishes the isolated environment wherein the optical and electrical contacts engage. Because single-chamber and "plug/receptacle joined-chamber" designs support connector mechanical, electrical and optical interchange requirements, the current WMC designs are susceptible to near term and long term application failures. For example, when the single or joined-chamber design is exposed to long-term environmental conditions, or to aggressive handling scenarios, the following performance shortcomings are prone to occur:

1. Distributed contamination and cross-contamination of chamber fluids, which are exchanged and mixed during the mating and dis-mating of the connector halves.
2. Coincident use of the engagement oil as the insulation media for the plug electrical pin(s), when the dielectric properties of such oil is degraded, leads to electrical failures in a powered un-engaged plug half.
3. Electrical connection failure resulting from marginalized fluid insulation qualities, as well as diminishing volumes of oil.
4. Venting of secondary series fluid volumes into the surrounding oil chamber such that oil is exchanged between the series chamber volumes.
5. Contamination of new connectors, through engagement of same with older, contaminated connectors.
6. Oil depletion within a new connector caused by engagement with an older, oil-depleted connector.
7. Optical connection failures due to low and/or contaminated fluid volumes.
8. Optical connection failures due to contamination resulting from lack of isolation barriers between electrical and optical contact environments.
9. Axial interface end-seal failures, leading to corresponding depletion of contract chamber isolation oil.
10. Axial interface end-seal lifecycle wear leading to ingress of contaminates into the joined chamber.
11. Axial interface end-seal mis-match from typical manufacturing tolerances leading to ingress and buildup of contaminates in the joined chamber over the connector lifecycle.

Because these WMC shortcomings are the consequence of multiple design factors, such failures are not resolvable without specifically addressing each area of concern.

In brief, then, while the current W M C technology has generally satisfied the operational requirements for a system of repeatable sub-oceanic mating and dis-mating of power and/or signal communication means, all of the current designs used to perform this function, are limited in their number of engagements and dis-engagements by the inherent increase in contamination, or depletion of the internal pressure-compensation fluids, that concurrently serves as, or communicates with, the contact chamber fluid, within which environment the internal contacts are required to function . . . and as such are also contaminated or depleted.

Whether through subtle or major failures of the internal or external sealing structures of such connectors, or through inherent increases in fluid contamination or depletion which by nature is made to occur with each mating and dis-mating of a typical WMC set, the contamination or depletion levels of these internal fluids inevitably result in sufficient degradation of the contact interfaces to render further service of the connector set impractical. In short, the operating life of the current WM C connector designs are limited by this specified condition.

The specific function of the Composite Connection System, however, is to provide a means by which to reliably and repeatedly mate and dis-mate an optical or electrical contact element while the said system is fully immersed within an extensively contaminated environment. It therefore follows, for example, that as one specific application of this Composite Connection System, is use as a stand-alone new and novel WMC with extended operating life, increasing the engagement cycle life of such mechanisms from dozens to multiple hundreds of engagement cycles. Recognizing the fabrication and installation costs of a typical WMC mechanism, such a multi-fold extension of operating life would represent exceptional savings in any instance of application.

A BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

FIG. 3 is a series of descriptive drawings of the principle internal mechanisms of one embodiment of the connector set proper.

FIG. 3c illustrates a diagrammatic representation of one embodiment of the sequential stages of action which occur during the mating process, and describing in particular, the behavior of the plug and receptacle interfaces, in relation to the progress of travel of a typical plug contact.

FIG. 3d illustrates one embodiment of a direct view of the example receptacle interface end.

FIG. 3e illustrates one embodiment of a transverse section view of the plug, which principally describes the shape, contours, and interface relationship between the plug shell and the insert shell.

FIG. 3f illustrates one embodiment of a transverse section view of the receptacle shell, taken particularly to describe the polygon profile geometry of the said shell.

FIG. 3h illustrates one embodiment of a representation of the automatic shut-off or fill valve located at the end of the shaft of the plug interface plate, and a description of its manner of operation.

FIG. 4 is a series of representations of an electrical contact embodiment of the invention, depicted in longitudinal section, arranged in such manner as to describe the articulated components of both the plug and receptacle configurations in various stages of engagement and disengagement.

FIG. 4a describes the receptacle contact configuration in such manner as to illustrate the relative positions and attitudes of these components in both the dis-mated and mated conditions.

FIG. 4b is a typical embodiment of the invention depicted in a sequential series of representations which describes the relative positions of the components of both the plug and receptacle contacts, at various stages of contact engagement.

FIG. 4c is a representation of the plug contact configuration, which has been transversely expanded to more clearly identify the functioning components, which are then numerically identified. FIG. 4c also includes an added comparative representation which illustrates the relationship of the various components of the plug contact in both the mated and dis-mated conditions.

FIG. 5 is a series of representations of an optical contact embodiment of the invention, depicted in longitudinal section, arranged in such manner as to describe the articulated components of both the plug and receptacle configurations of the concept, in various stages of engagement and disengagement.

FIG. 5a describes the receptacle contact configuration in such manner as to illustrate the relative positions and attitudes of these components in both the dis-mated and mated conditions.

Figure 5B:
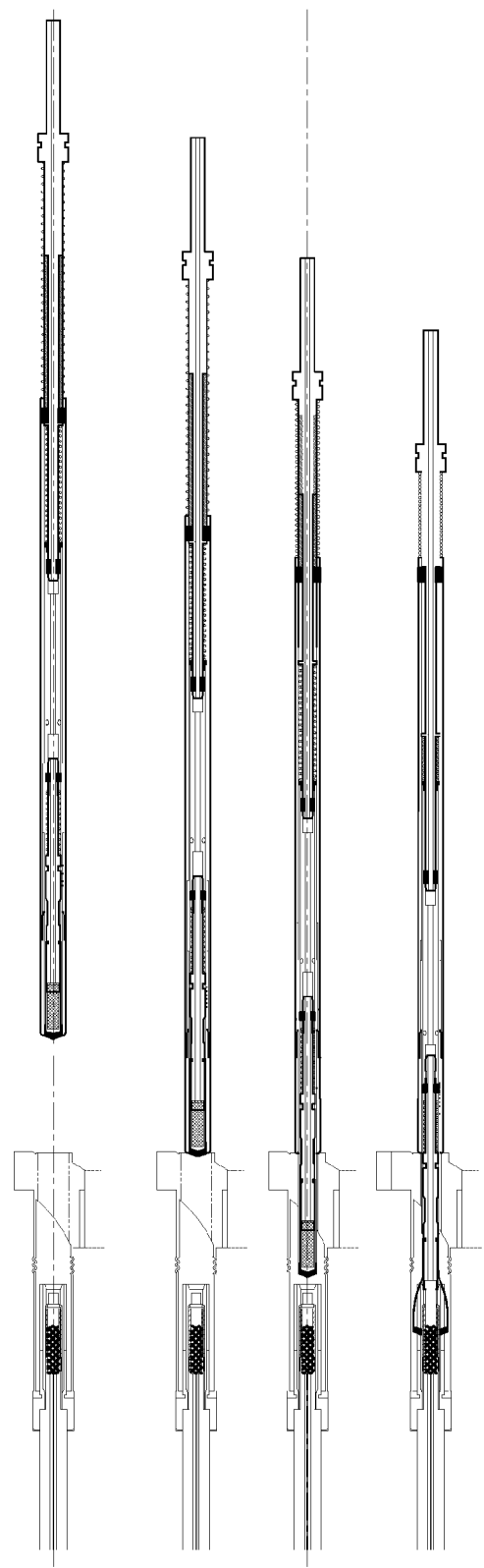

FIG. 5b is a typical embodiment of the invention depicted in a sequential series of representations which describes the relative positions of the components of both the plug and receptacle contacts, at various stages of contact engagement.

FIG. 5c is a representation of the plug contact configuration, which has been transversely expanded to more clearly identify the functioning components, which are then numerically identified. FIG. 5c also includes added comparative representations which illustrate the relationship of the various components of the plug contact during the mating process.

Figure 5D:
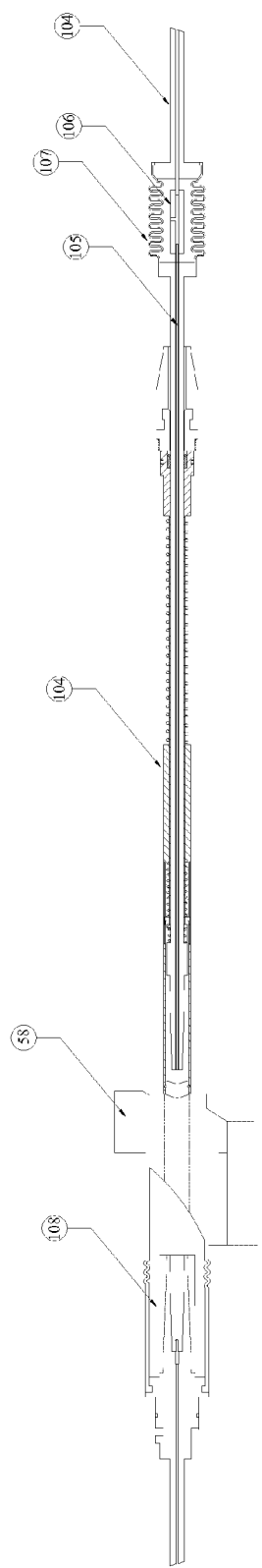

FIG. 5d is a representation of an alternate high voltage plug and receptacle contact embodiment that utilizes a combination of the functional components described in FIGS. 4 and 5 for the electrical and optical invention.

Figure 5E:
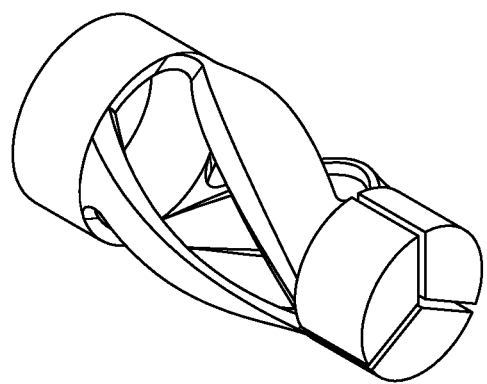

FIG. 5e is a representation of one embodiment of an end-seal utilized for the optical plug described in FIGS. 5a-5c, and the alternate high voltage contact described in FIG. 5d, disclosing the spiral form of the seal support stations.

FIG. 6 is a series of descriptive drawings which is intended to identify the principle components and features of the coupling system element of one embodiment of this connector set concept.

Figure 6A:
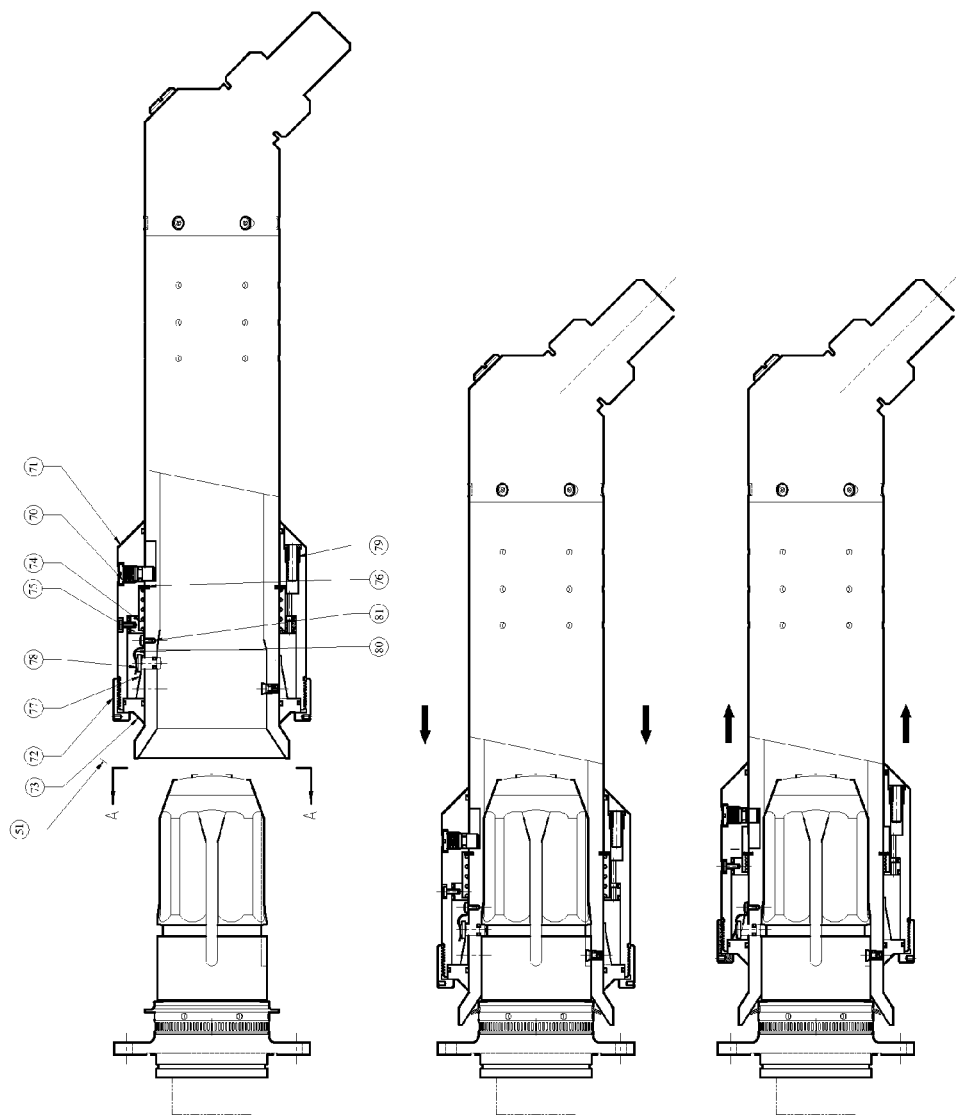

FIG. 6a illustrates a series of longitudinal section views of one embodiment of the plug-mounted connector coupling mechanism, which describes the behavior of the various internal components during stages of the connector set engagement process, and depicting this progression of events from top (fully disengaged), to middle (fully engaged), to bottom (coupling separation by a retraction of the coupling ring).

Figure 6B:
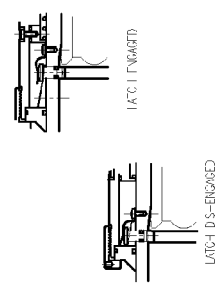

FIG. 6b illustrates a descriptive representation of one embodiment of the Coupling ring latching mechanism as it appears in both its engage and disengaged attitudes.

GENERAL CONCEPT DESCRIPTION

As a specific advancement in the art of electrical and/or optical contact design, the principle intent of this invention is to provide a means by which the electrical or optical contact interfaces of such contacts are, at all times, sealed from communication with surrounding environmental conditions during the mating and dis-mating process. Since the dynamics of the mating process of a typical electrical contact set may differ from that of an optical contact pair, where appropriate, separate embodiments of this invention are here provided for each of these contacts, and for an alternate contact configuration that utilizes features present in both types.

The basic operating concept for the mechanical interface of one embodiment of the connector system is illustrated in FIG. 3c, and is described in four sequential drawings. In the first drawing to the left, the scalloped discs represent the plug interface component 1 (far disc) and the receptacle interface component 2 (near disc). The two discs are shown separated, as in a position poised to mate. The plug interface disc 1, in this representation, is still positively seated into the interface end wall of the plug assembly, within an aperture of identical profile geometry. In like manner, the receptacle interface disc 2, in this representation, is still positively seated into the interface end wall of the receptacle assembly, also within an aperture of identical profile geometry.

A mating force applied to both the plug and receptacle assemblies next brings the two interface components together (as represented in the illustration next to the right). The joining of the two interface discs automatically locks these components together in such manner that their rotational attitudes will remain perfectly aligned throughout the entire mating, mated and dis-mating process. At the same time, the interfacing rims of the plug interface shell (insert shell cap 66) and the receptacle shells are joined to form a fluid-tight seal so as to prevent intermixing of surrounding seawater with the pressure compensating fluids contained within the plug and receptacle assemblies. To this point, each extreme extension of the scalloped profile (the crests of the profiles), is positioned to be located directly in the path of a plug contact. As the compressive force between the plug and receptacle is then increased, the joined interface discs are made to displace together into the forward cavity of the receptacle assembly.

During this displacement travel, the shaft of the receptacle interface component 2, is cammed into rotating as depicted in the third illustration of this drawing set. The interlocked condition of the two interface plates (plug and receptacle) assures that both of these components are made to rotate together, in perfect coincidence. The consequent effect of this rotation is to then shift the profile crests to one side, and to thereby allow a clear travel path for the plug contacts, as the compression of the plug and receptacle assemblies continues beyond the travel limits of the interface discs 1, 2 into a full-mated condition. Upon complete mating of the plug and receptacle assemblies, the coupling mechanism is enabled to fully engage, securing the plug and receptacle assemblies together until separation is achieved by retraction of the coupling actuation ring 6.

Receptacle Assembly

Figure 1:
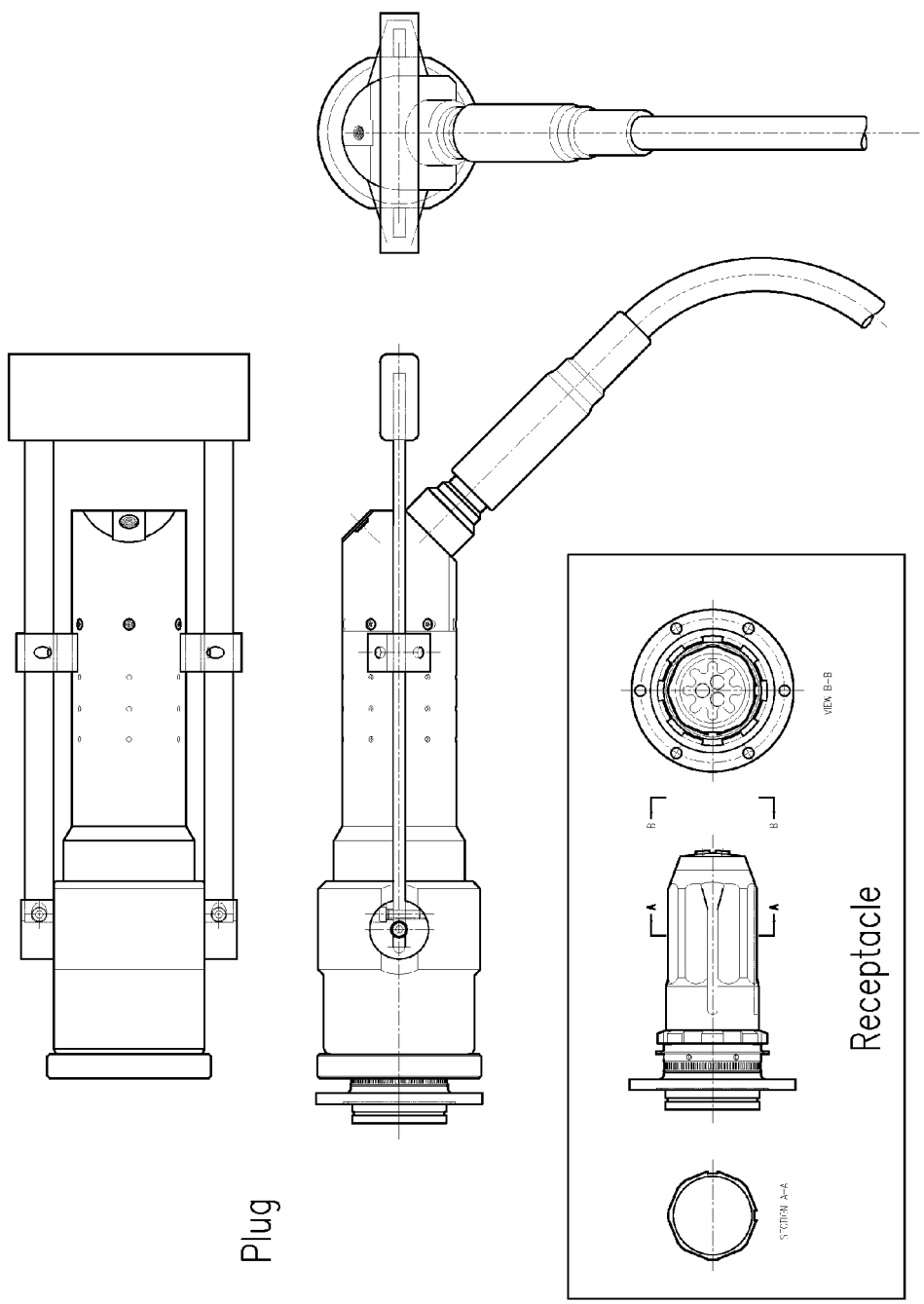
FIG. 1 illustrates a series of external profile views of one embodiment of a connector set in which the plug and related receptacle are independently represented in a configuration that would support bulkhead mounting of the receptacle and flying-lead engagement of the plug using a diver, fixture or ROV.
Figure 2:
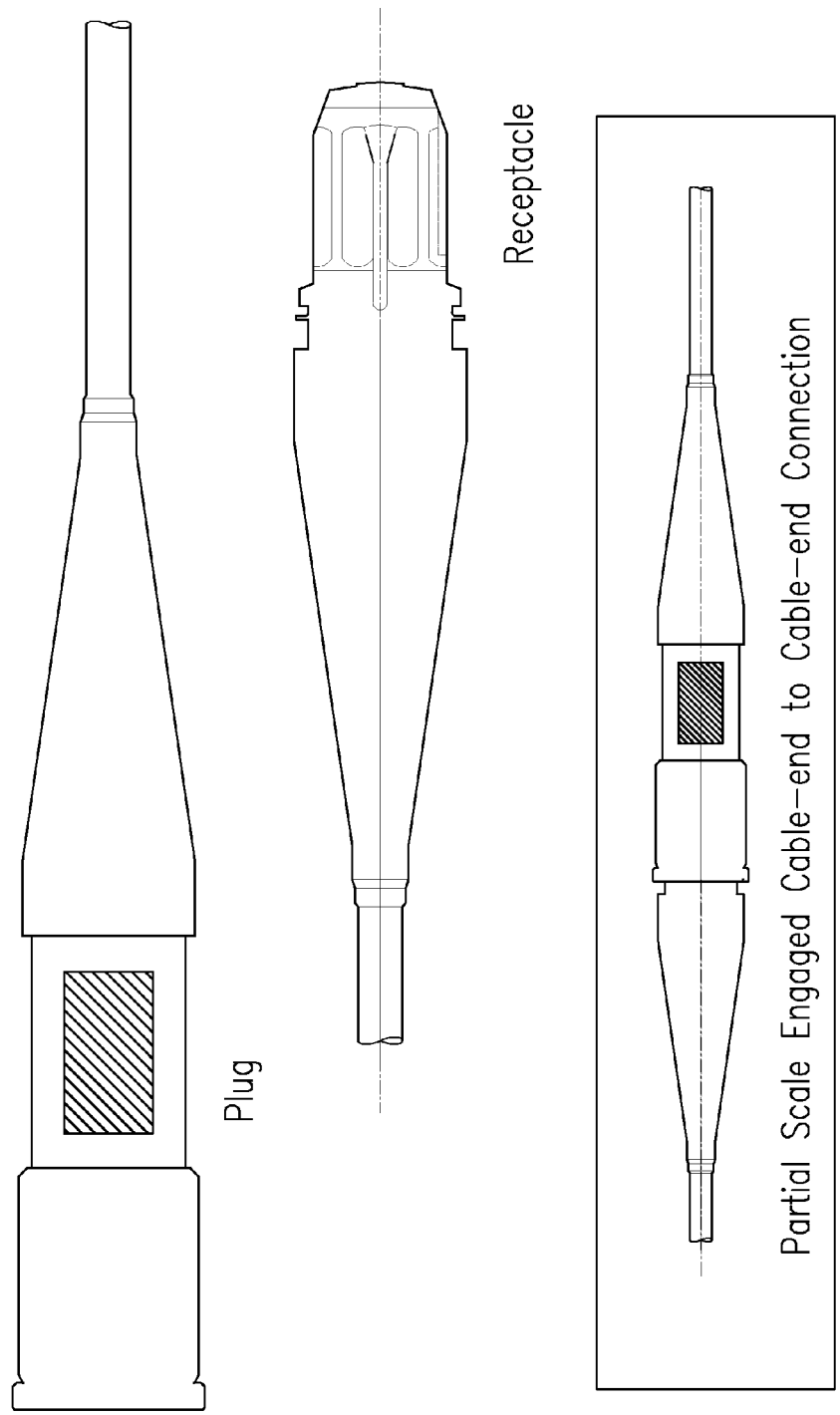
FIG. 2 illustrates a series of external profile views of one embodiment of a connector set in which the plug and related receptacle are independently represented in a configuration that would support cable-end to cable-end engagement of the receptacle and plug using either a diver, fixture, or ROV.
Figure 3A:
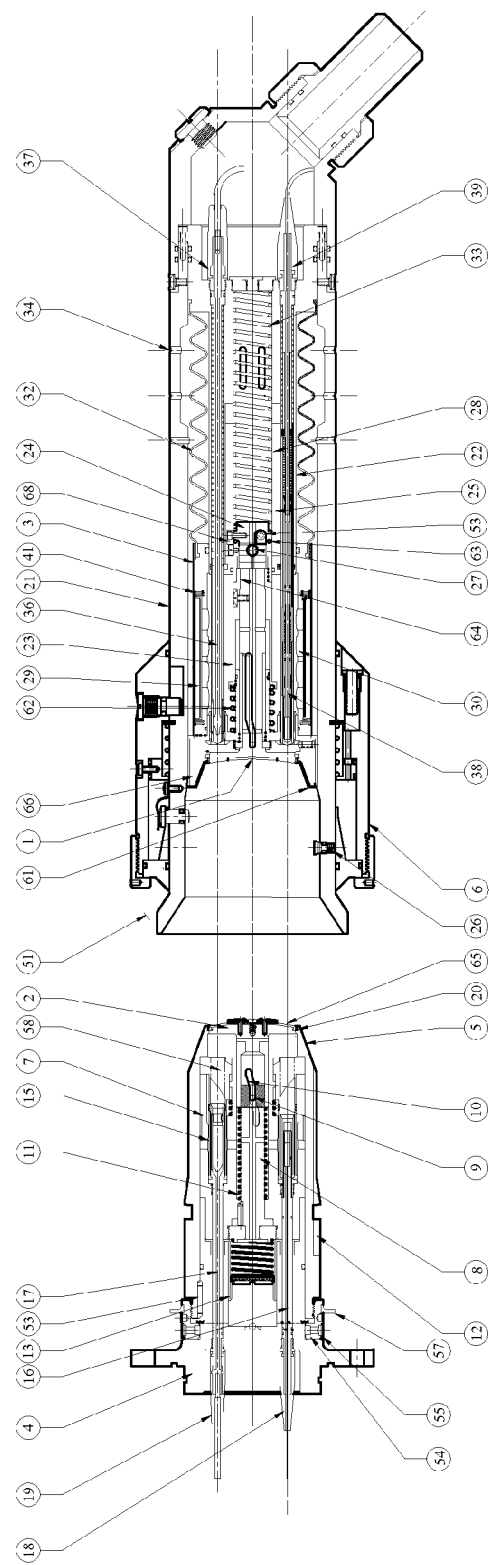
FIG. 3a illustrates a longitudinal section view of one embodiment of the complete plug and receptacle system, including numerical identifications of the various components and features of the internal mechanisms.

With reference to FIG. 3a, and more specifically to the longitudinal section view of the receptacle assembly, in one embodiment, the structure is composed of a receptacle shell 5 which houses an insert 7, which insert is installed in fixed orientation to the plug/receptacle alignment guide slot 12. This orientation is achieved and secured by the alignment of the receptacle shell 5 with the flange shell 4, by means of the alignment pin 53, and the alignment of the flange shell 4 with the insert 7 as a result of the common intrusion of the electric and/or optic contracts 16 and 17.

The flange shell 4 and the receptacle shell 5 are secured together by means of a threaded coupling ring 54, which assembly also serves to fixedly secure all of the internal components of the receptacle assembly. Within the core of the insert 7, and in fixed orientation, is secured the interface shaft guide post 8. This guide post 8 is mounted with camming pegs 9, which are functionally engaged to corresponding camming slots 10, which slots in turn are features of the shaft of the receptacle interface plate 2. Moreover, the exterior surface of the receptacle interface plate 2 is covered or coated with a thin, low-durometer, elastomeric gasket 65, to function as an interfacing seal, when engaged to the corresponding uncoated surface of the plug interface plate 1.

Mounted within the insert 7 is an array of electric contacts 17, which are secured and sealed into the flange shell 4 by means of a threaded interface and electric sealing boots 19 and/or mounted within the insert 7 is an array of optical contacts 16, which are secured and sealed into the flange shell 4 by means of optical strain relief boots 18. A multiplicity of such contacts, or alternate contacts containing elements of both optic and electric contacts, can be coincidentally arrayed within this assembly, in any combination. Moreover, each functional interconnection area of either the electric 17 or optical 16 contacts is enshrouded within an independent contact isolation membrane 15, as a component of a sub-assembly which also includes, at the forward end, a torsional sealing element 58. When the receptacle assembly is in the dis-mated condition, this torsional seal 58 serves to individually isolate the internal contact cavities from the forward, fluid-filled cavity located directly behind the receptacle interface plate. This element has through passages aligned with each contact cavity that are closed by a torsional preload on the seal element. During the mating process, the forward end of each seal 58 of the torsional seal element is so configured to relieve the seal preload, returning the seal to the unloaded but sealed state, as to permit passage by either type of intruding plug contact, whether an electric contact 36 or an optic contact 38.

Finally, by various configurations of channeling within the components of the receptacle assembly, the fluid-filled cavities of the said assembly are made to communicate with the internal surface of a main bellowphragm-type pressure compensation element 13. The external surface of this pressure compensation element 13, is made to communicate with the environmental seawater via radially configured channels through the walls of the flange shell 4, and then through, and around the assembly coupling ring 54. A measure of contaminant filtering of the surrounding seawater, during the compensation "breathing" process is achieved by means of a filter band 55, installed as a component of the assembly coupling ring 54.

In the dis-mated condition, the scalloped receptacle interface plate 2, is firmly seated within a correspondingly profiled, scalloped aperture at the interface end of the receptacle shell 5, and is held secure in this closed and sealed condition under the motivation of the interface plate spring 11, which surrounds the centrally located interface shaft guide post 8. Environmental sealing between the scalloped profile of the receptacle interface plate 1, and the corresponding seating surface of the receptacle shell 5 is further aided by a peripheral sealing gasket 20.

An elastomeric band 57 is made a component of the threaded coupling ring 54, in such manner as to serve as a contaminant sealing device, when the plug and receptacle assemblies are fully mated. The manner of this sealing function is clearly evident in the bottom-most longitudinal section view (fully mated view) of FIG. 3b.

Plug Assembly

With reference to FIG. 3a, and more specifically to the longitudinal section view of the plug assembly, in one embodiment, the internal mechanisms of the plug assembly are supported by a surrounding plug shell 21.

Secured within the plug shell 21, by means of threaded fasteners is the insert assembly, which insert assembly is secured within the plug shell 21, in fixed and precise orientation with regard to the plug/receptacle alignment peg 26, so as to assure precise alignment of the plug contact array, with the corresponding receptacle contact array, during the connector set mating procedure. Moreover, an intermediate supporting structure consisting of an insert shell 3 is installed concentric to the insert assembly, in such manner that the insert shell 3 is free to travel only in an axially aligned manner with respect to the plug shell 21. The insert assembly is free to travel within the insert shell 3, only in a precisely axial manner, and within predefined longitudinal limits. Moreover, the forward end of the insert shell 3 is fitted with an insert shell cap 66, which aids in the retention of internal components, provides positional support for the plug assembly contacts 36 and 38 and serves as a facilitating means for product assembly.

FIG. 3e, which depicts a transverse section (section C-C) taken through the body of one embodiment of the plug assembly, describes the interface relationship between the external surface of the insert shell 3, and the bore of the plug assembly compensator mounting ring 41, which in turn is installed within the plug shell 21. This interface can be entirely exposed to seawater environment, as well as to sand, silt, and other sea-floor contaminants. In the illustrated embodiment, the external profile of the insert shell 3 is characterized by a polygonal geometry, which rides within a cylindrical bore, so as to provide an interface configuration that is least prone to contaminant degradation, to binding or to failure during normal operation in the presence of such conditions.

In the illustrated embodiment, a tubular, corrugated, elastic, environmental isolation bellows 32 is fixed and sealed at the rear of the insert shell 3, while at the other end of the said environmental isolation bellows 32 the said bellows is fixed and sealed to the rear segment of the insert assembly. This assembled configuration yields an internal sub-assembly mechanism that is sealed against all environmental conditions, and is provided with automatic pressure/temperature compensation, and for any consequent variations of internal fluid volumes.

Moreover, the environmental isolation bellows is simultaneously capable of handling the changes in volume that will be experienced during the complete cycles of mating and dis-mating of the connector set. The external surface of this isolation bellows 32 is provided access to environmental seawater by means of venting holes 34 through walls of the plug shell 21. Additional temperature/pressure fluid-volume compensation is provided by means of a compensation element 29, installed onto the body of the insert shell 3, as illustrated both in the longitudinal section view of the plug assembly, and in the transverse section (C-C), FIG. 3e. Effective venting 30, for the proper operation of this compensation element 29, are also depicted in these section views.

The insert assembly, as above described, is principally composed of an insert 22, an array of plug assembly electric contacts 36, and/or an array of plug assembly optical contacts 38. The plug assembly electric contracts 36 are secured into the rear of the insert 22 by means of electric contact boot seals 37. The plug assembly optical contracts 38 are secured into the rear of the insert 22 by means of optical contact strain relief boot assemblies 39. Within the bore of the insert 22, an insert sleeve 25 is fixedly attached, which insert sleeve 25 is also provided with an array of "L"-shaped slots 28. These "L"-slots 28 are correspondingly engaged by a mating set of "L"-slot pegs 27, which "L"-slot pegs 27 are made to be fixed components of the valve body 24, which valve body 24 is a press-fitted component affixed onto the end the shaft portion of the plug interface plate 1.

Under the compressed motivation of a shaft spring 33, a shaft spring cap 23, which also serves as a component of a fluid-venting valve assembly, is fitted into the end of the valve body, through a bearing 63 that enables a low-friction rotational relationship between the shaft spring cap 23 and the valve body 24. As described below, the "L"-slot pegs 27 in relation to the "L"-slot features 28 of the insert sleeve 25, provide the means by which the plug interface plate 1 is retained in its proper axial and radial positions, and is securely seated, into the scalloped aperture at the interface end of the of the insert shell cap 66, under the influence of the interface plate spring 62.

In the same manner as the "L" slot pegs 27 and "L" slot features 28 serve to define the proper orientation of the plug interface plate shaft 1, so too does the guide block 68, which is affixed to the shaft spring cap 24, maintain the proper orientation of that shaft spring cap 24, in relation to the valve body 23 and to the plug interface plate shaft 1, to which the valve body 23 is fixedly attached. This orientation is governed by the continuous location of this guide block 53 within an "L" slot feature 28. During their press-fitted assembly, proper relative orientation of the valve body 23 and the plug interface plate shaft 1, is assured by means of an alignment pin 64.

Coupling Mechanism

The top-most illustration of FIG. 6a, is a longitudinal section view of one embodiment of a coupling ring mechanism, which identifies all of the significant components of the system, and their positioning in relationship to each other. The plug shell 21 comprises the foundation of the mechanism, onto the end of which is mounted the principle engagement element, the coupling assembly 51. The coupling assembly 51, in turn, is secured to the plug assembly by means of the retaining peg/s 70, which retaining pegs 70 are threaded into the actuation ring 71, so as to protrude into a groove feature of the plug shell 21. The groove/s feature of the plug shell 21 is configured to permit a translational motion of the coupling ring 71 of up to a fixed travel limit.

A retainer ring 72 is attached onto the actuation ring 71, and is secured by a threaded interface between the actuation ring 71 and the retainer ring 72. The retainer ring 72 captures the wedge ring 73 and secures it to the actuation ring 71. The installation of the actuation ring 71 is coincident with the installation of a return spring 74, which is retained by the spring stop 75 and snap ring 76. The spring stop 75 is also attached to the actuation ring 71 using threaded fasteners.

At appropriate locations of an inner diameter of the wedge ring 73, wedge slot features 77 are provided, which feature can be engaged with actuator pins 78, that are made to retract from translational movement of the wedge ring 73, to thereby reposition the pins 78 in a retracted de-latching position.

Activation of the actuator pins 78 as shown in FIG. 6b, and in the lower illustration of FIG. 6a, resulting in upward displacement of the actuator pin 78 is also made to occur upon initial seating of the receptacle assembly into the plug assembly. This function is accomplished through a precise configuration of the receptacle shell 5 profile, in relation to correspondingly precise dimensioning of the mechanical interface geometry of the plug assembly and its coupling ring mechanisms. Upon complete seating of the receptacle assembly into the plug assembly the actuator pins 78 return to their downward orientation and engage the plug in the latching position.

In order to protect the functionality of the latching mechanism from the hazards of seawater and of sea floor contaminants, the actuator pins 78 are sealed along with the actuation ring 71, wedge ring 73, and spring stop 75 using O-rings at each leak path. The coupling assembly is then filled with a non-corrosive fluid and compensated for temperature and pressure changes with elastomeric compensator bellow 79.

Coupling Ring Operational Sequence

The complete sequence of operations which define the overall function of one embodiment of a coupling system is represented in the stylized sequential diagrams of FIG. 6a. The last diagram, illustrates how a physical retraction of the actuation ring 71 of the plug assembly (when the said plug assembly is dis-mated from its mating receptacle assembly) is made until, the full retraction of the said actuation ring 71 causes the latch pins 78 to retract.

The second diagram of FIG. 6a describes the instant of complete mating of the plug and receptacle assemblies, at the precise moment when the ramped contour of the receptacle shell 5 has fully displaced the actuator pin 78, the pin 78 is returned to the engaged position by spring ring 80 the is fixedly attached to plug shell 21 by fasteners 81.

The third diagram of FIG. 6a describes the attitude of all of the principle components of the coupling mechanism, in the fully mated condition, and in particular it illustrates the actuation ring 71, in relation to the slot feature/s of the wedge ring 73. In this attitude, pins 78 are perfectly positioned to retract into full dis-engagement mode, whenever the actuation ring 71, is next retracted under the influence of an external force.

Finally, it will be noted from the longitudinal section views of FIG. 6a that the coupling assembly 51 is configured with sealed interfaces, to facilitate successful engagement of this plug assembly with its mating receptacle assembly, even under conditions of contamination and fowling which are likely to occur when such mating is to be performed by remote mechanical aids, such as a conventional undersea ROV.

Plug Receptacle Mating Sequence

Figure 3B:
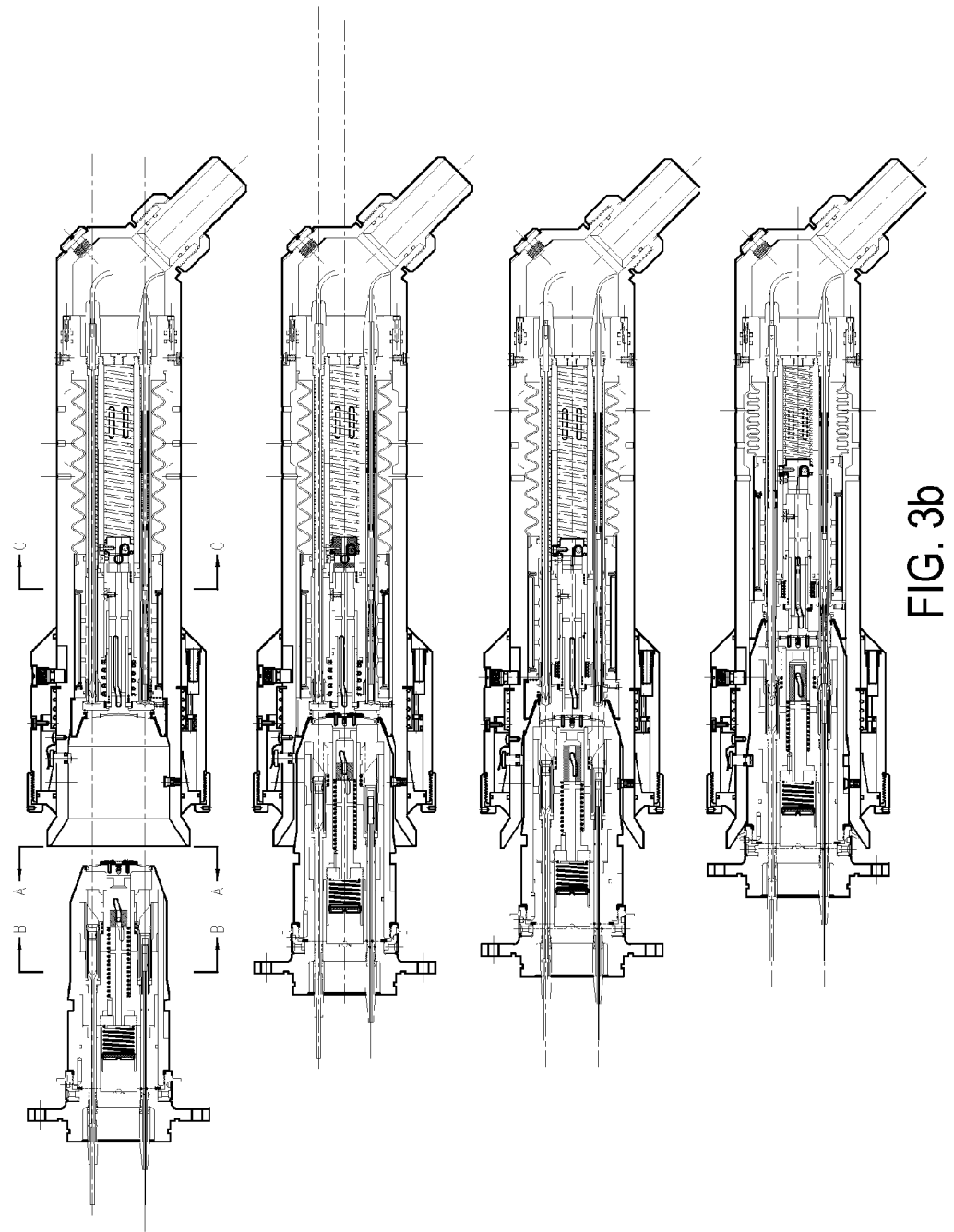
FIG. 3b illustrates a series of longitudinal section views of one embodiment of the plug and receptacle connector set, which describes the behavior of the various internal components during stages of the connector set engagement process, and depicting this progression of events from top (fully disengaged), to bottom (fully engaged).
Figure 3G:
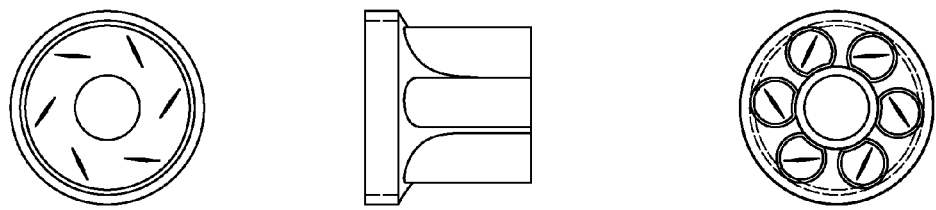
FIG. 3g illustrates one embodiment of a representation of a torsional-seal element which functions to isolate fluid-filled cavities of the plug or receptacle assemblies, but which can be penetrated by either electric or optic plug assembly contacts.

FIG. 3b provides a series of longitudinal section views of one embodiment of both the plug and receptacle assemblies, which views describe the sequential behavior of the internal mechanisms of this connector system and contacts during the entire engagement process. The top-most illustration describes a fully dis-mated connector set, showing the quiescent condition of all internal components.

The second section view illustrates the initial interface contact of the plug and receptacle assemblies, and describes the manner in which raised features on the receptacle interface plate 2, engage into corresponding recessed features of the plug interface plate 1, which features are made to be completely identical in position and contour. These interface features can provide a means by which to securely fix the plug interface plate 1 and the receptacle interface plate 2 together so that their orientation, relative to each other will be held coincident throughout the connector set mating process. This section view further demonstrates that upon initial contact, the receptacle shell 5 of the receptacle, which is the forward-most structural component of the receptacle, and the insert shell end 66 of the plug assembly, are in direct contact, and will remain so throughout the mating process.

The third section view describes the effects of the initial compressive force as it is applied to the engagement of the plug and receptacle assemblies. Upon application of this force, the travel of the insert shell 3, within the plug shell 21, over the receptacle shell 5, immediately applies a corresponding force, within the plug assembly, directly to the rear of the environmental isolation bellows 32 and to the interface shaft spring 62. Since the plug insert shell cap 66 is in constrained contact with the receptacle shell 5, this compressive force acts to directly compress the environmental isolation bellows 32. The same force, being applied to the rear of the interface shaft spring 62, however, is made to motivationally displace the plug insert shell 3, by acting through its related components.

Since the plug interface plate 1 (and its integral shaft) are in firm contact with the receptacle interface plate 2, both interface plates are coincidentally made to displace directly into the forward cavity of the receptacle assembly. The coincident axial movement of the receptacle interface plate 2 causes its integral shaft, within the core of the receptacle assembly, to act and compress against the receptacle interface spring 11. The receptacle interface spring 11 is installed directly over and around the interface shaft guide post 8. As stated earlier, this guide post 8 is fixedly attached to the base structure of the receptacle assembly, and has mounted to it, an array of camming pegs 9. Also as described earlier, these camming pegs 9 are engaged into a corresponding array of camming slot features 10, which are an integral feature of the shaft of the receptacle interface plate 2, which shaft is also made to slip-fit over, and to slide along, the guide post 8.

The shaft is constrained in its motion along and around the guide post 8 by the limitations of the camming slot features 10 of the shaft, and the related camming pegs 9, which are affixed to the guide post 8. As the shaft portion of receptacle interface plate 2 is made to travel into receptacle assembly, the effect of the camming pegs 8, which act within the camming slot features 10 of the shaft of the receptacle interface plate 2, is to cause the said receptacle interface plate to rotate through a predefined orientational angle. The configuration of the camming slot feature 10, during this motion, serves both to limit the specific length of travel of the two joined interface plates, and to effect a controlled rotation of the two joined interface plates to an exact rotational excursion.

Since this initial motion of the plug interface plate 1 is locked and coincident to the motion of the receptacle interface plate 2, the traveling rotation of the shaft of the receptacle interface plate 2 imposes a coincident traveling motion on the shaft of the plug interface plate 1. It will further be noted from the third illustration of FIG. 3*b* that the insert 22 within the plug assembly, as well as the array of electric plug assembly contacts 36 and the array of optical plug assembly contacts 38, are all mechanically secured to the plug shell 21, and that therefore the insert and Contact arrays must all move coincidently with the motion of the plug shell 21.

The third illustration of FIG. 3*b* shows that the initial forward travel of the joined interface plates and related components, was also coincident with the forward motion of the complete array of the plug assembly Contracts. Moreover, since the insert shell 3 was constrained from any further forward motion, the entire array of electric plug assembly Contacts 36 and optical plug assembly contacts 38 was made to translate toward the receptacle 5.

The initial travel of the joined interface plates and the array of plug assembly contacts are limited by the length of the camming slot features 10 within the receptacle assembly. Moreover, through the geometry of the camming slot features 10, this travel yields a controlled rotation of the joined interface plates, so that the crests of the scalloped periphery of the interface plate profiles, no longer obstruct the forward motion of the any of the advancing plug assembly contacts.

Referring once more to a comparison between the second and third illustrations of FIG. 3*b*, it will be seen that in the second illustration, the "L"-slot pegs 27 are seated at the crest of the short leg of the "L" slot features 28, which features are a part of the insert sleeve 25, which sleeve is fixedly attached to the bore of the insert 22. As previously stated, the insert 22 is mechanically fixed to the basic plug assembly structure, i.e. the plug shell 21. Thus, as depicted in the second illustration of FIG. 3*b*, the axial motion of the joined interface plates, as well as their shafts and associated components, is restricted to motion coincident with that of the plug shell 21.

It will further be noted in the third illustration of FIG. 3*b*, that when the initial axial travel of the joined interface plates, as well as their shafts and associated components, has reached its limits, as defined by the camming slot features 10 within the receptacle assembly, that action of the camming slot features 10 has also caused a consequent rotation of that entire chain of components, including the positioning of the "L" slot pegs 27, which pegs 27 as a result of rotation, are now given access to the long, axial leg of the "L" slot features 28 within the insert sleeve 25. This re-alignment of the "L" slot pegs 27, in relation to the associated "L" slot features 28 within the insert sleeve 25 now yields a potential for further travel of the plug shell 21, and its related components, beyond the controlled and limited travel of the joined interface plates and their associated components.

The final length of compression between the plug and receptacle assemblies causes engagement and automatic locking of the Coupling ring mechanism, as described earlier in this disclosure. A further effect of this final length of travel, is represented in the fourth (bottom) illustration of FIG. 3*b*, in which is shown the total extent of travel of the complete plug assembly contact array, to the point where full penetration of the said plug assembly Contact array into the receptacle assembly torsional seal 58 and respective electrical and optical contacts 15 and 16 is achieved, within the body of the receptacle assembly. The fourth illustration of FIG. 3*b* also shows that during the excursion of the plug assembly contact array, each plug assembly contact is made to pierce the torsional seal element 58 that has been actuated to remove its preloaded sealing force as described earlier. The torsional seal element 58, is designed to isolate the principle fluid-filled cavities of the receptacle assembly, from the individual fluid-filled cavities of each receptacle contact area. The torsional seal element 58 provides each contact with an elastic membrane isolation shroud 15 which enables the displacement of fluid within the shroud 15 to be translated into a displacement of the coincident volume directly to the volume of the surrounding fluid within the principle cavities of the receptacle assembly.

With reference to FIGS. 4 and 5, more specifically to the longitudinal section view of the plug electrical and optical contact assemblies, one embodiment of an electrical and optical contact are each separately described through the mating sequence.

When typically installed within a plug assembly, the aft end (the right end as illustrated in FIG. 4) of the plug electrical contact assembly 36 is fixedly attached to the plug structure, while the outer plug contact element, composed of the end cap 83 and end cap keys 88 and the outer sleeve 82 is free to move axially within the plug cavity. When the plug and its contact/s are fully dis-mated, the electrical contact 85 remains retracted within the outer sleeve 82, under the influence of the pre-loaded spring 84. In this attitude, the exposed interface surface of the conductive component of the electrical contact 85 is protected and secured against the surrounding environment, at the forward end, by the "O"-ring seal 86, and at the aft end by an "O"-ring seal 87 which latter seal is understood to be a component of the plug assembly within which this example embodiment of the plug contact assembly would be installed.

Also, in the dis-mated condition, with the plug electrical contact assembly 36 fixed within the surrounding plug assembly, the outer sleeve is constrained against the spring 84 pre-load by the O-ring 86 detent in electrical contact 85, or by a similar retention or shoulder feature. By this means, motion of the outer sleeve 82, under the influence of the pre-loaded spring 84 is restricted to the engagement of the outer sleeve 82 with the receptacle torsional seal 58 contact surface.

As demonstrated in the sequential illustrations of FIG. 4b, during the mating process of the surrounding plug assembly with its corresponding receptacle assembly, the forward edge of the outer sleeve 82 and electrical contact 85 end is made to firmly engage against the torsional seal element 58 under the forceful influence of the continued compression of the spring 84. This action tends to jointly seal the outer sleeve 82 to the torsional seal face where further displacement of the mating sequence releases the torsional seal preload and allows the plug electrical contact 85 to penetrate the seal and make contact with the receptacle electrical contact 16.

Later, as the connector set separation is made to occur, it can be seen that the electrical contact surface of the electrical contact 85 will be fully retracted into the sealed environment within the outer Sleeve 82, and the receptacle torsional seal 58 will have fully closed, before the plug electrical contact assembly 36 can separate from its engagement to the outer rim of the torsional seal 58.

Similarly for the plug optical contact assembly 36 where one embodiment of the design shows the aft end (the right end as illustrated in FIG. 5) of the core, aft segment 89 is fixedly attached to the plug structure, while the outer sleeve 90, and its press-fitted related component, the outer sleeve end-cap 91, is free to move axially within the plug cavity. Moreover, the core, aft segment 89 is axially fixed to the core, forward segment 92, by means of the contact core anchoring key 93, rendering both core elements as functionally a single piece. In addition, the axial travel of the core aft segment 89 is limited within the outer sleeve 90 by the constraining effects of the core travel limiting key 94. Finally, when the plug optical contact is in the fully disengage condition, the core aft segment 89 is held in its fully retracted position, in relation to the outer sleeve 90, under the influence of the pre-loaded outer sleeve spring 95. Moreover, when the plug optical contact is in the fully dis-engage condition, the axial position of the inner sleeve 96 is constrained by the action of the pre-loaded inner sleeve spring 97. Then too, the axial position of the optical plug stem 98, in relation to the core forward segment 92 is influenced by the pre-loaded optical contact interface spring 99, while the travel limits of the optical plug stem 98, in relation to the core forward segment 92 are defined by the stem travel limiting key 100. Dynamic environmental sealing within the inner sleeve 96 is achieved by means of the "O"-ring seals 101. Finally, the interface contact surface of the optical contact 102 is environmentally sealed under the protection of the closed condition of the spiral contact module seal 103 and FIG. 5e, which is held forcefully closed by its containment within the inner sleeve 96.

As demonstrated in the sequential illustrations of FIG. 5b, during the mating process of the surrounding plug assembly with its corresponding receptacle assembly, the forward edge of the end-cap 91 is made to firmly engage against the torsional seal element 58 under the forceful influence of the continued compression of the spring 99. This action tends to jointly seal the plug contact to the torsional seal element 58 face where further displacement of the mating sequence releases the torsional seal 58 preload and allows the plug contact to penetrate the seal.

As the surrounding plug assembly eventually becomes fully seated into its related receptacle assembly, the plug contact core assembly 89, and its mechanically engaged plug optical stem 98 are made to fully engage within the optical receptacle contact assembly, and the interfaces of both the plug and receptacle optical contacts are made to join. During this final stage of engagement between the plug and receptacle optical contacts, the plug spiral contact module seal 103, and its related plug optical stem 98 are made to exit the constraining bore of the inner sleeve 96. At this point, the pre-wound molded attitude of the plug spiral contact module seal 103 causes this seal element to segmentally unwind and flair, within the confines of the receptacle contact module shell, and in so doing, to allow for physical contact between the interface surfaces of the plug and receptacle optical contacts. Finally, the physical contact between the interface surfaces of the plug and receptacle optical contacts is forcefully sustained by the recoil action of the plug optical stem 98, under the influence of optical contact interface spring 99. Axial recoil travel of the plug optical stem 98 within the core forward segment 92, is limited by means of the stem travel limiting key 100.

Later, as the connector set separation is made to occur, the action of the contact interface spring 99 causes a repositioning of the of the plug optical stem 98 to the limit of travel defined by the stem travel limiting key 100. Further separation of the surrounding connector set causes retraction of all of the core components of the plug optical contact within the inner sleeve 96, under the influence of the inner sleeve spring 97. This action includes the retraction and consequent re-sealing of the spiral plug contact module seal 103, within the inner sleeve 96. The limit of this retracting travel is defined by the shoulder geometries of the inner sleeve 96 and the outer sleeve 90. Only as the separation of the surrounding plug and receptacle assemblies is completed, is full dis-engagement of the forward edge of the end-cap 91, from the outer rim of the receptacle torsional seal 58 allowed to occur.

Alternate Contact Embodiment

Referencing FIG. 5d showing an alternate plug high voltage electrical contact assembly 104 and associated high voltage receptacle contact 108 configuration using torsional receptacle seal 58. Wherein certain very high voltage electrical applications, such as submarine telecom cables, an electrical contact of the design shown is best suited. One embodiment of this contact style combines the optical plug spiral contact module seal 103 and FIG. 5e and a dielectric oil-fed tube conductor 105, oil-fed splice termination 106, and conductor termination oil compensation and fill bellow 107. This results in a high voltage electrical contact design with a combination actuation sequence similar to the sequences described previously for the optical and electrical contact assembly.

By the sequence of actions thus described, the environmentally sealed condition of the cores of both the plug and receptacle optical contacts is a condition which is maintained until both contacts are forcefully joined—at which time; the interface of this joining is then opened to achieve a condition that, in combination, is environmentally sealed and separated from the mechanical engagement oil chambers cavities. Then finally, during the separation process, the forced joining of both the plug and receptacle contacts is sustained, until the traveling elements of the optical plug contact are fully refracted and both the plug and receptacle contacts are each fully sealed once again. Thus the contact oil chambers of the composite connection system remain separated from the mechanical engagement oil chambers before, during, and after connector engagement, and during and after disengagement Fluid Venting and Temperature/Pressure Compensation As discussed above, in one embodiment, the cavities within the plug and receptacle assemblies are filled with an appropriate fluid as a principle element for pressure compensation, i.e. as a medium that would maintain an equilibrium of pressure within the connector set cavities to be coincident with variations in the pressure of the surrounding environment. As an aid to this compensation means, elastic membranes, bellows and the like are also provided in the walls of the receptacle and plug outer structures, to act as resilient interface barriers. In general, this resilient interface barrier not only aids in accommodating variations in environmental pressure, but also relieves volumetric changes within the connector set chambers, which may result from thermal expansion or contraction of the pressure compensating fluid. In addition to accommodating volumetric changes due to variations in temperature and pressure, the resilient barriers provided in the structure of this connector set, have been made elastic enough to handle the much greater volumetric changes which occur during the mating and dis-mating procedures during which significant compression and expansion of the internal cavities are made to happen.

Considerable circulation of the compensating fluid is made to occur throughout the various cavities within the system. In addition, this circulation of fluids between cavities is rendered even more complex by the fact that when the plug and receptacle assemblies become physically engaged, and the joined interface plates are made to displace into the forward cavity of the receptacle assembly, the forward cavities (mechanical interface cavities) of both the plug and receptacle assemblies effectively become a single cavity . . . with common fluid content.

Moreover, the physical action of joining the plug and receptacle interfaces introduce trace amounts of environmental contamination into the system fluids. Furthermore, each subsequent action of mating and dis-mating must nominally add to this level of foreign contamination. Finally, mechanical wear and similar factors must also add trivial amounts of other kinds of contaminants to the total. This incremental buildup of fluid contamination need not necessarily degrade the overall performance of this connector system, provided that the corrupted fluids are not permitted to interfere with the performance and/or functionality of either the electrical or optical contact junctions. For this reason, it is a feature of at least one embodiment of the present invention to maintain a high degree of isolation in regard to the fluid flow between various cavities within the system, and in particular, the junctions of electrical and optical interfaces, in the area of the receptacle assembly contacts within the receptacle assembly.

To satisfy this requirement it will be noted in FIG. 3b of the receptacle assembly, each receptacle contact is provided with an independent elastic cavity 15 which, in conjunction with its associated contact seal elements provides an isolated fluid environment, which is protected from the effects of potentially contaminated fluids of the surrounding cavity. Then too, with reference to the plug assembly, it will be noted that in the area of the plug assembly contact extensions (forward of the insert 22), that no communication of fluid is permitted to other cavities of the connector system, and that an independent means of volumetric compensation is provided, at six places, in the walls of the insert sleeve 3.

Again with reference to the plug assembly (FIG. 3b), it will be noted that in one embodiment of the plug assembly a channel of fluid communication is provided, through the shaft of the plug interface plate 1 to the cavity surrounded by the environmental isolation bellows 32. However, it should also be noted (FIG. 3b), that at the end of the shaft of the plug interface plate 1 a valve mechanism has been incorporated. This mechanism, consisting of the shaft end of the plug interface plate 1, the valve body 24, which is press-fitted to the end of the shaft, and the shaft spring cap 23 is positioned to regulate access between the forward-most and rear-most cavities of the plug assembly. The shaft spring cap 23 is so configured that its motion within the insert sleeve 25 is limited to axial motion only. This limitation is achieved by having provided a guide block 53, which is fixedly attached to the shaft spring cap 23, and is made to fit into the longitudinal leg of an "L" slot feature 28 of the insert sleeve 25.

By means of the guide block 53, which is made to ride within the longitudinal leg of an "L" slot feature 28, the motion of the shaft spring cap 23, during the mating and dis-mating procedures, is limited to axial travel only. As can be seen in FIG. 3h that since the shaft spring cap 23 is constrained from rotation, the rotation of the valve body 24, automatically seals or unseals access of fluids from the radial channels within the cap. By this means exchange or addition of fluid is possible between the forward-most and rear-most cavities of the plug assembly, but only during a portion of the initial travel of the joined interface plates. As the cammed rotation of the interface plates is made to occur, as previously described, the shaft of the plug interface plate 1 is also made to rotate, carrying with it the press-fitted valve body 24, so that upon complete mating of the connector set, the valve is made to constrain fluid venting between the forward and aft cavities of the plug assembly.

While various embodiments have been described for purposes of this disclosure, such embodiments should not be deemed to limit the teaching of this disclosure to those embodiments. Various changes and modifications may be made to the elements described above to obtain an result that remains within the scope of the systems and methods described in this disclosure.

The invention claimed is:

1. A connector set comprising:
   a plug having a front fluid chamber in series with a secondary fluid chamber having electrical or optical contacts;
   a receptacle having a front fluid chamber in series with a secondary fluid chamber having electrical or optical contacts, the receptacle being adapted to receive the plug;
   wherein the front fluid chamber of the plug comprises a mechanical engagement chamber and the front fluid chamber of the receptacle comprises another mechanical engagement chamber, and wherein the mechanical engagement chambers are configured to mechanically engage with each other and become a contiguous mechanical engagement chamber providing barrier layer isolation between the external environment and the secondary fluid chambers of the plug and receptacle before, during, and after engagement of the plug and receptacle, and where the secondary fluid chamber of the plug and the secondary fluid chamber of the receptacle are configured to engage with each other and become a contiguous contact chamber for isolated contact engagement of the electrical or optical contacts of the plug with the electrical or optical contacts of the receptacle, and where the mechanical engagement chamber of the plug and the mechanical engagement chamber of the receptacle remain barrier separated from the secondary contact fluid chamber of the plug and of the receptacle before, during, and after engagement of the plug and receptacle.

2. The connector set of claim 1, wherein the front fluid chamber of the plug is barrier separated from the secondary fluid chamber of the plug and the front fluid chamber of the receptacle is barrier separated from the secondary fluid chamber of the receptacle.

3. The connector set of claim 2, wherein the front fluid chamber of the plug is barrier separated from the secondary fluid chamber of the plug whereby ingress of contamination into the secondary fluid chamber of the plug is prevented, and wherein the front fluid chamber of the receptacle is barrier separated from the secondary fluid chamber of the receptacle whereby ingress of contamination into the secondary fluid chamber of the receptacle is prevented.

4. The connector set of claim 2, wherein the front fluid chamber of the plug is in series alignment with the secondary fluid chamber of the plug whereby contact passage is made through the front fluid chamber of the plug, and where the front fluid chamber of the receptacle is in series alignment with the secondary fluid chamber of the receptacle whereby contact passage is made through the front fluid chamber of the receptacle.

5. The connector set of claim 2, wherein the front fluid chamber of the plug and the front fluid chamber of the receptacle are each barrier separated respectively from the secondary fluid chamber of the plug and the secondary fluid chamber of the receptacle forming dedicated and sealed mechanical engagement chambers in the plug and the receptacle prior to engagement of the plug and the receptacle.

6. The connector set of claim 2, wherein the front fluid chamber of the plug and the front fluid chamber of the receptacle are each barrier separated respectively from the secondary fluid chamber of the plug and the secondary fluid chamber of the receptacle forming dedicated and sealed contact chambers prior to engagement of the plug and receptacle.

7. The connector set of claim 1, wherein barrier separation of the contact chamber in the plug and in the receptacle from the contiguous mechanical engagement chamber of the engaged plug and receptacle, reduces contamination of the secondary contact fluid chamber of the plug and of the receptacle.

8. The connector set of claim 1, wherein interface valves form a barrier end-seal between the mechanical engagement chamber of the plug and the mechanical engagement chamber of the receptacle prior to engagement of the plug and the receptacle.

9. The connector set of claim 8, wherein the interface valves rotate upon connector engagement of the plug and receptacle.

10. The connector set of claim 9, wherein the interface valves, when rotated, provide linear passages between the front fluid chambers of the plug and receptacle.

11. The connector set of claim 10, wherein the interface valves, when rotated, each provide passage for at least one electrical contact.

12. The connector set of claim 8, wherein each of the interface valves provides a sealing interface between the surface of the respective interface valves.

13. The connector set of claim 8, wherein each of the interface valves is installed in a carrier shell providing a sealing interface between the carrier shell and about a perimeter of the respective interface valve prior to engagement of the plug and receptacle.

14. The connector set of claim 13, wherein each of the carrier shells has a multi-sided geometry, whereby each of the carrier shells can translate within an outer plug shell without influence from external fowling.

15. The connector set of claim 8, wherein each of the interface valves, when rotated, provides passage for at least one optical contact.

16. The connector set of claim 8, wherein each of the interface valves is configured such that each of the interface valves is capable of being scaled in size to accommodate a range of contact diameters.

17. The connector set of claim 8, wherein each of the interface valves has at least one interface scallop to accommodate at least one contact passage.

18. The connector set of claim 17, wherein, on each of the interface valves, geometry of the at least one interface scallop is defined as a shape that when rotated accommodates at least one contact passage.

19. The connector set of claim 8, wherein the interface valves provide environmental isolation of the secondary contact chamber entry seals in the plug and receptacle.

20. The connector set of claim 8, wherein each of the interface valves of the plug also contains a fill valve that is actuated during engagement.

21. The connector set of claim 20, wherein each of the fill valves is configured to inlet additional fluid to the mechanical engagement chamber during engagement of the plug and receptacle then isolate the mechanical engagement chamber following engagement of the plug and receptacle.

22. The connector set of claim 1, wherein the plug and the receptacle each have a secondary seal that provides environmental isolation of the respective front fluid chambers from the secondary fluid chambers of the plug and receptacle respectively.

23. The connector set of claim 22, wherein the secondary seals form a barrier between the contact chamber and the mechanical engagement chamber of the plug and of the receptacle before, during, and after engagement of the plug and receptacle.

24. The connector set of claim 23, wherein each of the secondary seals is configured as a single seal element with multiple entries or as a single seal element with a single entry.

25. The connector set of claim 23, wherein the secondary seal of the plug provides barrier sealing when in contact with the secondary seal of the receptacle.

26. The connector set of claim 23, wherein the secondary seals are each actuated by mechanical methods.

27. The connector set of claim 23, wherein the secondary seals each provide linear passages between the secondary fluid chambers of the plug and receptacle.

28. The connector set of claim 23, wherein the secondary seals, when actuated, each provide linear passages between the front fluid chambers of the plug and receptacle.

29. The connector set of claim 23, wherein the secondary seals, when actuated, each provide passage for at least one electrical contact.

30. The connector set of claim 23, wherein the secondary seals, when actuated, each provide passage for at least one optical contact.

31. The connector set of claim 23, wherein the secondary seals each provide isolated front fluid chambers that are separate from the secondary fluid chambers within the plug and the receptacle, respectively.

32. The connector set of claim 23, wherein the secondary seals each provide isolation between a plurality of contact pins in the plug and in the receptacle.

33. The connector set of claim 22, wherein the secondary seals of the plug and of the receptacle are barrier sealed by a combination of torsional and axial loading.

34. The connector set of claim 22, wherein the secondary seals are each actuated through contact with a corresponding contact seal and prevent fluid transfer from each of the secondary contact fluid chambers to each of the mechanical engagement chambers during actuation of the secondary seals.

35. The connector set of claim 1, wherein, before engagement of the plug and the receptacle, the front fluid chamber and the secondary fluid chamber of the plug and the front fluid chamber and the secondary fluid chamber of the receptacle each enclose separate and isolated fluid volumes.

36. The connector set of claim 35, wherein the front fluid chambers in the plug and the receptacle become contiguous following engagement of the plug and receptacle.

37. The connector set of claim 35, wherein the front fluid chamber fluid volumes are not contiguous with the secondary contact fluid chamber fluid volumes.

38. The connector set of claim 35, wherein dual barrier sealing is developed in an axial direction between the plug and receptacle before, during, and after engagement of the plug and receptacle.

39. The connector set of claim 38, wherein the dual barrier axial sealing reduces optical and electrical contact chamber contamination.

40. The connector set of claim 39, wherein reduced contact chamber contamination allows repeated engagement of high power optic contacts without fowling of the high power optic contacts.

41. The connector set of claim 39, wherein reduced contact chamber contamination allows repeated engagement of high voltage electrical contacts without fowling or providing a voltage breakdown path for the high voltage electrical contacts.

42. The connector set of claim 39, wherein reduced contact chamber contamination allows repeated engagement of high circuit count optical contacts without fowling of the high circuit count optical contacts.

43. The connector set of claim 39, wherein reduced contact chamber contamination allows composite engagement of hybrid optical electrical contacts without fowling or cross contaminating the hybrid optical electrical contacts.

44. The connector set of claim 39, wherein reduced contact chamber contamination allows increased engagement cycles without contact chamber fowling.

45. The connector set of claim 1, wherein the plug and receptacle each have a multisided shell that engages an outer shell without influence from external fowling.

46. The connector set of claim 1, wherein when the plug and the receptacle are engaged they become latched together by a spring loaded pin latching mechanism.

47. The connector set of claim 46, wherein the spring loaded pin latching mechanism is an environmentally isolated component not subject to external fowling.

48. The connector set of claim 46, wherein the spring loaded pin latching mechanism is radially actuated by axial motion.

49. The connector set of claim 46, wherein the spring loaded pin latching mechanism is radially reset by an inverse associated axial motion.

* * * * *